United States Patent [19]

Belcher et al.

[11] Patent Number: 5,203,016
[45] Date of Patent: Apr. 13, 1993

[54] SIGNAL QUALITY-DEPENDENT ADAPTIVE RECURSIVE INTEGRATOR

[75] Inventors: Donald K. Belcher, W. Melbourne; Darrell R. Gimlin, Melbourne Beach, both of Fla.

[73] Assignee: Harris Corporation, Melbourne, Fla.

[21] Appl. No.: 545,299

[22] Filed: Jun. 28, 1990

[51] Int. Cl.$^5$ .................. H04B 7/02; H04B 15/00
[52] U.S. Cl. ................. 455/52.3; 455/242.2; 455/305; 330/85; 330/280
[58] Field of Search ............... 455/242, 234, 216, 305, 455/18, 52.3; 330/85, 129, 179, 280

[56] References Cited

U.S. PATENT DOCUMENTS

| | | | |
|---|---|---|---|
| 3,440,543 | 4/1969 | Polzl | 455/242 |
| 3,939,437 | 2/1976 | Adam | 330/85 |
| 4,128,848 | 12/1978 | Nakagawa | 455/305 |
| 4,546,326 | 10/1985 | Van Uffelen et al. | 330/129 |
| 4,807,035 | 2/1989 | Sayliss | 330/129 |
| 4,811,404 | 3/1989 | Vilmur et al. | 455/305 |
| 4,829,593 | 5/1989 | Hara | 455/234 |
| 5,051,707 | 9/1991 | Fujita | 330/280 |

FOREIGN PATENT DOCUMENTS

| | | | |
|---|---|---|---|
| 0012127 | 1/1986 | Japan | 455/234 |
| 0120532 | 5/1988 | Japan | 455/234 |

*Primary Examiner*—Reinhard J. Eisenzopf
*Assistant Examiner*—Timothy H. Keough
*Attorney, Agent, or Firm*—Evenson, Wands, Edwards, Lenahan & McKeown

[57] ABSTRACT

The gain of a recursive integrator is controlled so as to be adaptive to the quality of a received signal by comparing the magnitude of its emphasized information component with a reference voltage and controlling the gain of the integrator's feedback delay path in accordance with the difference between the peak value of the emphasized information component and the reference voltage. As a result, when the signal to noise ratio of the input signal is high, the gain can be reduced, so that the recursive loop will adapt quickly to changes in a multipath profile.

9 Claims, 1 Drawing Sheet

SIGNAL QUALITY-DEPENDENT ADAPTIVE RECURSIVE INTEGRATOR

FIELD OF THE INVENTION

The present invention relates in general to communication systems and is particularly directed to an improved recursive integrator which adapts its gain in accordance with the signal to noise ratio of the received signal.

BACKGROUND OF THE INVENTION

Recursive integration is a well known signal processing mechanism for emphasizing a periodic signal that may be embedded in noise, and is commonly used to facilitate synchronous detection of signals that are subject to multipath propagation. The basic mechanism is comprised of a delay feedback loop through which a delayed version of the input signal is repetitively summed with the input signal. The feedback loop has its time delay defined in accordance with the period of the periodic signal of interest. Because many signal processing applications subject the receiver to a wide range of environmental conditions (e.g. substantial variations in temperature), parameters of individual components may vary and lead to instability, particularly where the delay line is implemented using a 'lossy' surface acoustic wave device, so that considerable compensation gain is required.

SUMMARY OF THE INVENTION

In accordance with the present invention, there is provided a new and improved recursive integration signal processing mechanism the gain of which is controlled so as to be adaptive to the quality of the received input signal. Just as in a conventional recursive integrator, the adaptive mechanism of the present invention contains a gain-imparting feedback delay path through which a delayed version of the input signal is recursively summed with the input signal for the purpose of emphasizing its information component. The gain is controlled so as to be adaptive to changes in the signal to noise ratio by comparing the magnitude of the emphasized information component with a reference level and controlling the gain of the feedback delay path in accordance with the difference between the peak value of the emphasized information component of the input signal and a reference level. As a result, when the signal to noise ratio of the input signal is high, the gain can be reduced, so that the recursive loop will adapt quickly to changes in a multipath profile. Where the signal to noise ratio of the received signal is low so that the magnitude of the emphasized information signal is initially lower, the gain is increased, thereby increasing the magnitude of the emphasized information signal component at the output of the integrator.

DETAILED DESCRIPTION

Figure 1:
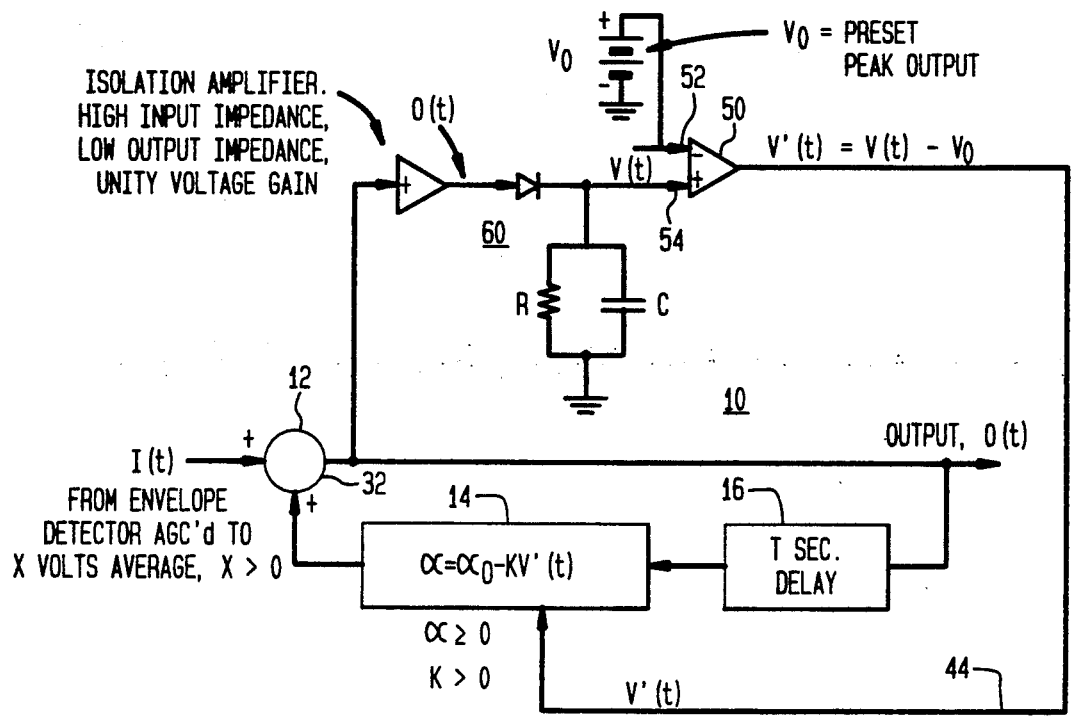
FIG. 1 diagrammatically illustrates an embodiment of the adaptive recursive integrator in accordance with the present invention.

Before describing in detail the adaptive recursive integrator in accordance with the present invention, it should be observed that the present invention resides primarily in a novel structural combination of conventional communication circuits and components and not in the particular detailed configurations thereof. Accordingly, the structure, control and arrangement of these conventional circuits and components have been illustrated in the drawings by a readily understandable block diagram which shows only those specific details that are pertinent to the present invention, so as not to obscure the disclosure with structural details which will be readily apparent to those skilled in the art having the benefit of the description herein. Thus, the block diagram illustration does not necessarily represent the mechanical structural arrangement of the exemplary system, but is primarily intended to illustrate the major structural components of the invention in a convenient functional grouping, whereby the present invention may be more readily understood.

Figure 2:
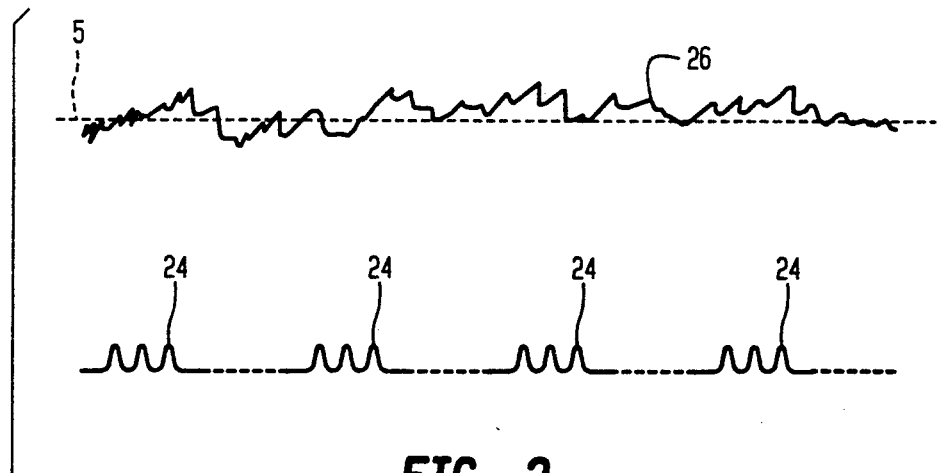
FIG. 2 shows a comparison of the levels of noise and a recurring group of multipath signals.

Referring now to FIG. 1 an embodiment of the adaptive recursive integrator in accordance with the present invention is diagrammatically illustrated as comprising a recursive integrator feedback loop 10, containing a summing circuit 12, a variable gain amplifier 14 and a delay 16. Summing circuit 12 has a first input 22 coupled to receive an input signal from an upstream signal conditioning circuit, such as an automatic gain control circuit, that maintains the average level of the received signal to be processed around some preset level. The received signal is comprised of both a periodic information component and a noise component. The level of the noise is typically considerably greater than the information component, so that, as shown in FIG. 2, the desired information signal e.g. a recurring group of multipath signals 24, is effectively 'buried' in, or well below, the average level 25 of the noise 26.

A second input 32 of summing circuit 12 is coupled to the output of variable gain amplifier 14, the input of which is coupled to the output of delay circuit 16, the input of which is coupled to the output 42 of summing circuit 12. The gain of variable gain amplifier 14 is controllably adjustable substantially in inverse proportion to the magnitude of a control signal on line 44. Line 44 is coupled to the output of a difference circuit 50, a first input 52 of which is coupled to receive a prescribed reference voltage Vo and a second input 54 of which is coupled to a peak detector 60. Peak detector 60 is coupled to the output 42 of summing circuit 12 and serves to provide an output representative of the peak value of the envelope of the emphasized information signal as produced by summing circuit 12.

As described briefly above, in a recursive integrator, the input signal is repetitively summed with a delayed version of itself in order to produce an output signal in which the periodic information component is emphasized. Since, however, operational parameters of signal processing components of the recursive loop are subject to environmentally based variations (e.g. temperature change), the loop is subject to instability problems, especially when lossy delay line components, such as surface acoustic wave devices, are employed. To effectively remove this instability problem and enable the recursive feedback loop to adapt itself to the quality of the input signal (signal to noise ratio), the extent to which the emphasized information component (peak of the output of summing circuit 12) differs from a fixed reference level, as defined by a reference voltage Vo, is used to control the gain of variable gain amplifier 14. Specifically, the gain of variable gain amplifier 14 is controlled in accordance with the difference between the peak value of the emphasized information component of the input signal and the reference voltage Vo. As a result, when the signal to noise ratio of the input signal at input 22 is high, the gain of variable gain amplifier 14 is reduced, so that recursive loop 10 will adapt quickly to changes in the input signal profile (e.g. multipath). Where the signal to noise ratio of the received signal is low, so that the magnitude of the emphasized information signal is initially reduced, the gain is increased, thereby increasing the magnitude of the emphasized information signal component at the output of the integrator.

It is to be observed that the above-described sensitivity of the adaptive recursive integration mechanism of the present invention to the quality (signal to noise ratio) of the input signal is not to be confused with recursive integration mechanisms which maintain the open loop gain of the feedback loop close to a prescribed value (e.g. unity) on the basis of a parameter that is independent of the input signal. For example, the Remley U.S. Pat. No. 3,263,169 describes a mechanism which maintains the open loop gain of the recursive feedback loop for a spectrum analyzer close to unity in accordance with variations in a gated portion (above a prescribed threshold) of an injected local oscillator or pilot signal. The gated pilot signal may also be used to trigger the horizontal deflection circuits of the cathode ray tube display of the spectrum analyzer. The purpose of the injected local oscillator signal is to provide an artifice that maintains the open loop gain of the recursive loop at a value close to unity independently of the quality of the input signal source. Such a system neither seeks to nor is it capable of adapting the performance of the recursive loop in accordance with the quality of the input signal. As a consequence, it is unable to quickly adapt to a rapidly changing, but tolerable (high signal to noise ratio) multipath signal profile.

In accordance with the present invention, on the other hand, as mentioned above, since gain control is signal quality-dependent, then for high signal to noise ratio multipath signals, the open loop gain will be decreased to a value considerably less than unity and the associated memory requirement is reduced, thereby enabling the loop to quickly adapt to a rapidly changing multipath profile.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a communication system in which an information signal transmitted from a transmitter site may be subjected to multipath propagation and received at a receiver site in the presence of noise, an apparatus for processing received multipath signals in order to identify said information signal comprising:
a recursive integrator which includes a summing device, said summing device having a first input to which the received signal is applied, an output and a second input, a controllable gain, feedback delay path coupled between said output and said second input, said controllable gain feedback delay path applying, to said second input of said summing device, a controlled gain, delayed version of a summation signal produced at the output of said summing device; and
a gain control circuit coupled between said output and said controllable gain feedback delay path, said gain control circuit controlling the gain of said controllable gain feedback delay path in accordance with said received signal.

2. An apparatus according to claim 1, wherein said gain control circuit comprises a peak detector coupled to the output of said summing device, said peak detector having an output coupled to one input of a difference circuit, a second input of which is coupled to a reference voltage level, said difference circuit having an output coupled to said controllable gain feedback delay path and controlling the gain thereof in accordance with the difference between said reference voltage level and the output of said peak detector.

3. For use with a communication system in which an information signal transmitted from a transmitter site may be contaminated by noise when received at a receiver site, an apparatus for processing a received signal in order to emphasize said information signal comprising:
a recursive integrator which includes a summer, said summer having a first input to which the received signal is applied, an output and a second input, a controllable gain, feedback delay path coupled between said output and said second input, said controllable gain feedback delay path applying, to said second input of said summer, a controlled gain, delayed version of a summation signal produced at the output of said summer; and
a gain control circuit coupled between said output and said controllable gain feedback delay path, said gain control circuit controlling the gain of said controllable gain feedback delay path in accordance with the quality of said received signal.

4. An apparatus according to claim 3, wherein said gain control circuit comprises a peak detector coupled to the output of said summer, said peak detector having an output coupled to one input of a difference circuit, a second input of which is coupled to a reference voltage level, said difference circuit having an output coupled to said controllable gain feedback delay path and controlling the gain thereof in accordance with the difference between said reference voltage level and the output of said peak detector.

5. For use with a communication system in which an information signal transmitted from a transmitter site may be contaminated by noise when received at a receiver site, a method of processing a received signal in order to emphasize said information signal comprising the steps of:
(a) recursively integrating said received signal; and
(b) controlling the gain of the recursive integration of said received signal carried out in step (a) in dependence upon the quality of said received signal; and
wherein step (a) comprises coupling said received signal to a recursive integrator which includes a summer, said summer having a first input to which the received signal is applied, an output and a second input, a controllable gain, feedback delay path coupled between said output and said second input, said controllable gain feedback delay path applying, to said second input of said summer, a controlled gain, delayed version of a summation signal produced at the output of said summer, and wherein step (b) comprises controlling the gain of said controllable gain feedback delay path in accordance with the quality of said received signal.

6. A method according to claim 5, wherein step (b) comprises coupling a gain control circuit between said output and said controllable gain feedback delay path, said gain control circuit comprising a peak detector coupled to the output of said summer, said peak detector having an output coupled to one input of a difference circuit, a second input of which is coupled to a reference voltage level, said difference circuit having an output coupled to said controllable gain feedback delay path and controlling the gain thereof in accordance with the difference between said reference voltage level and the output of said peak detector.

7. For use with a communication system in which an information signal transmitted from a transmitter site is subjected to a multipath propagation over multiple signal propagation paths so that multiple versions of said information signal have respectively different propagation times are received at a receiver's site in the presence of noise, a method of processing the received multiple versions of said information signal, in order to emphasize said information signal comprising the steps of:

(a) coupling said received multiple versions of said information signal to a recursive integration signal processor the gain of which is controllable variable, said recursive integration signal processor providing an emphasized information signal output; and (b) reducing the gain of said recursive integration signal processor in response to the signal to noise ratio of said emphasized information signal output provided in step (a) being greater than a prescribed level, so as to enable said recursive integration signal processor to quickly respond to changes in the profile of said multiple versions of said information signal.

8. A method according to claim 7, wherein said recursive integration signal processor includes a summing device, said summing device having a first input to which said received multiple versions of said information signal are applied, an output and a second input, a controllable gain, feedback delay path coupled between said output and said second input, said controllable gain feedback delay path applying, to said second input of said summing device, a controlled gain, delayed version of a summation signal produced at the output of said summing device, and wherein step (b) comprises reducing the gain of said controllable gain feedback delay path in accordance with said emphasized information signal output provided in step (a).

9. A method according to claim 8, wherein step (b) comprises coupling a peak detector to the output of said summing circuit, said peak detector having an output coupled to one input of a difference circuit, a second input of which is coupled to a reference voltage level, said difference circuit having an output coupled to said controllable gain feedback delay path for reducing the gain thereof in accordance with the difference by which the output of said peak detector exceeds said reference voltage level.

* * * * *